United States Patent
Nakaike

(10) Patent No.: US 8,990,786 B2
(45) Date of Patent: Mar. 24, 2015

(54) PROGRAM OPTIMIZING APPARATUS, PROGRAM OPTIMIZING METHOD, AND PROGRAM OPTIMIZING ARTICLE OF MANUFACTURE

(75) Inventor: Takuya Nakaike, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 494 days.

(21) Appl. No.: 13/307,731

(22) Filed: Nov. 30, 2011

(65) Prior Publication Data
US 2012/0159461 A1    Jun. 21, 2012

(30) Foreign Application Priority Data
Dec. 15, 2010   (JP) .................................. 2010-279022

(51) Int. Cl.
*G06F 9/45*      (2006.01)

(52) U.S. Cl.
CPC .............. *G06F 8/4443* (2013.01); *G06F 8/443* (2013.01); *G06F 8/447* (2013.01); *G06F 8/4441* (2013.01)
USPC ............ 717/139; 717/140; 717/151; 717/159

(58) Field of Classification Search
CPC ........... G06F 8/41; G06F 8/433; G06F 8/443; G06F 8/445; G06F 8/447; G06F 8/4441; G06F 8/4442; G06F 9/30174; G06F 9/45504; G06F 9/45508
USPC .................. 717/139, 140, 151, 159
See application file for complete search history.

(56) References Cited

U.S. PATENT DOCUMENTS

| 8,266,609 B2* | 9/2012 | Harris ........................... 717/159 |
| 8,739,163 B2 | 5/2014 | Ceze et al. |
| 2007/0169031 A1* | 7/2007 | Harris ........................... 717/140 |
| 2007/0300238 A1* | 12/2007 | Kontothanassis et al. .... 719/320 |

(Continued)

FOREIGN PATENT DOCUMENTS

| JP | 05334337 A2 | 12/1993 |
| JP | 11015362 A2 | 1/1999 |

(Continued)

OTHER PUBLICATIONS

Johnson, Neil Edward, "Code Size Optimization for Embedded Processors," University of Cambridge, 2004, last retrieved from http://citeseerx.ist.psu.edu/viewdoc/download?doi=10.1.1.94.2356&rep=rep1&type=pdf on Mar. 21, 2014.*

(Continued)

*Primary Examiner* — Qing Chen
*Assistant Examiner* — Andrew M Lyons
(74) *Attorney, Agent, or Firm* — Jeff Tang

(57) ABSTRACT

An apparatus having a transactional memory enabling exclusive control to execute a transaction. The apparatus includes: a first code generating unit configured to interpret a program, and generate first code in which a begin instruction to begin a transaction and an end instruction to commit the transaction are inserted before and after an instruction sequence including multiple instructions to execute designated processing in the program; a second code generating unit configured to generate second code at a predetermined timing by using the multiple instructions according to the designated processing; and a code write unit configured to overwrite the instruction sequence of the first code with the second code or to write the second code to a part of the first code in the transaction.

12 Claims, 11 Drawing Sheets

(56) References Cited

U.S. PATENT DOCUMENTS

2008/0172662 A1* 7/2008 Harris et al. ............ 717/159
2009/0006750 A1 1/2009 Taillefer et al.
2011/0320785 A1* 12/2011 Chen et al. ............ 712/233

FOREIGN PATENT DOCUMENTS

JP 2002318990 A2 10/2002
JP 2010113529 A 5/2010

OTHER PUBLICATIONS

Wikipedia, "Just-in-time compilation," Nov. 12, 2010, last retrieved from en.wikipedia.org/w/index.php?title=Just-in-time_compilation&oldid=396398477.*

Neelakantam, N., et al., "A Real System Evaluation of Hardware Atomicity for Software Speculation," ASPLOS 2010, Proceedings of 15th edition on Architectual support for programmin languages and opering systems, also published in ACM SIGARCH Computer Architecture News—ASPLOS '10 vol. 38, Issue 1, Mar. 2010.

Neelakantam, N., et al., "Hardware Atomicity for Reliable Software Speculation," ISCA '07, Proceedings of the 34th annual international symposium on Computer architecture, Jun. 9-13, 2007.

Ito, Y., et al., "Nested Transaction memory Selecting the Optimal Rollback Point," 2009 Information Processing Society of Japan SIG Tech. Report, vol. 2009-ARC-184 No. 5, Aug. 4, 2009.

Alpern, B., et al., "Dynamic Linking on a Shared-Memory Multiprocessor," Proceedings of International Conference on Parallel Architectures and Compilation Techniques, Newport Beach, CA, Oct. 12-16, 1999, pp. 177-182.

* cited by examiner (a)

(b)

(a)

```
public class Foo1 {
  public void A() {
    ...
    a = foo2.getValue() ;
    ...
  }
}
```

Fig. 4A (b)

```
Foo1. A() :
  ...
  tbegin                          ; BEGIN TRANSACTION
  ori      r3 , r5 , 0            ; SET ARGUMENT 1
  ld       r11 , (r5)             ; LOAD FUNCTION TABLE
  ld       r11 , 80 (r11)         ; LOAD ADDRESS OF CALL
  mtctr    r11                      DESTINATION FUNCTION
  bctrl                           ; CALL FUNCTION Foo2.getValue()
  ori      r8 , r3 , 0            ; READ RETURN VALUE
  tend                            ; COMMIT TRANSACTION
  ...
```

Fig. 4B (a)

```
public class Foo2 {
    private int value ;
    public int getValue() {
        return value ;
    }
}
```

Fig. 6A (b)

```
Foo2. getValue() :
    lwz      r3 , 16 (r3)       ; READ VALUE OF VARIABLE value
    blr                          ; RETURN TO CALL SOURCE
```

Fig. 6B (a)

```
ori     r3, r5, 0       ; SET ARGUMENT 1
ld      r11, (r5)       ; LOAD FUNCTION TABLE
ld      r11, 80 (r11)   ; LOAD ADDRESS OF CALL DESTINATION
                          FUNCTION
mtctr   r11
lwz     r3, 16 (r3)     ; READ VALUE OF VARIABLE value
ori     r8, r3, 0       ; READ RETURN VALUE
```

Fig. 7A (b)

```
lwz     r8, 16 (r5)     ; READ VALUE OF VARIABLE value
nop
nop
nop
nop
nop
```

PROGRAM OPTIMIZING APPARATUS, PROGRAM OPTIMIZING METHOD, AND PROGRAM OPTIMIZING ARTICLE OF MANUFACTURE

CROSS-REFERENCE TO RELATED APPLICATIONS

This application claims priority under 35 U.S.C. §119 from Japanese Patent Application No. 2010-279022 filed Dec. 15, 2010, the entire contents of which are incorporated herein by reference.

BACKGROUND OF THE INVENTION

The present invention relates to an apparatus for optimizing a program including multiple instructions, by dynamically rewriting the program. The present invention also relates to an optimization method, as well as to a computer-readable optimizing program for implementing the method.

The programs causing computers to perform a predetermined operation are written by using programming languages. The programming languages include: a machine language, which can be directly interpreted by the computers for execution; a low-level language such as an assembly language which corresponds one-to-one to its machine language and is close to the machine language; and a high-level language such as C, C++, or Java (registered trademark), which does not correspond one-to-one to the machine language and is written in a text format more easily understandable by human beings.

The computers cannot directly interpret and execute a program written in assembly language or high-level language. For this reason, the computers translate the program into the machine language directly interpretable by the computers by software called an assembler or a compiler, and then execute the program.

The programs in the assembly language are used in cases where: it is desired to perform a further optimization for the execution of an application having a limitation on the execution speed or program size, than the optimization achievable by the ability of the compiler; a programmer needs to control CPU operation; a resource such as a memory capacity or an arithmetic execution speed or the like is limited; and the like, for example. In addition, the assembly language is also used for development of a kernel and a device driver, and the like.

The programs in the high-level language are widely used in general since they can be written in a text format. The programs are translated into the machine language by a compiler. At this time, the programs are translated into the assembly language and outputted once, and then translated into the machine language by an assembler.

The assembler includes a type called an inline assembler, which allows a description in the assembly language to be included in a program written in the high-level language. The inline assembler optimizes a program by replacing a portion of the program that occupies most of the execution time with a description in the assembly language and thus achieves an execution speed close to that of the program written in the assembly language.

Heretofore, programs have been optimized to increase the execution speeds thereof by using the programs written in the assembly language described above or by using the inline assembler. As a program optimization technique, a technique to dynamically rewrite a binary sequence including multiple instructions is known.

There is a technique to dynamically rewrite a binary sequence by using a special instruction of a CPU such as a compare-and-swap (CAS) instruction, for example. With this technique, a value of a certain memory location is read and then stored, a new value is calculated on the basis of the value, and thereafter, the new value is stored in the memory location. During this processing, whether or not the value used in the calculation is recorded is checked at the time of rewriting, and if the value is not recorded, the processing is performed again from the beginning. Accordingly, a conflict between processors can be prevented, and the memory location can be atomically checked and changed.

Furthermore, there is a technique to replace a load and store instruction with a branch instruction to branch to the patch area (refer to Bowen Alpern, Mark Charney, Jong-Deok Choi, Anthony Cocchi, Derek Lieber, "Dynamic Linking on a Shared-Memory Multiprocessor," [online], 1999, the Internet <URL: http://citeseerx.ist.psu.edu/viewdoc/download-?doi=10.1.1.23 .8877&rep=repl&type=pdf>, for example). This technique is for backpatching instructions in a symmetric multi-processing environment. With this technique, only the first word of the original code is changed, and a synchronization protocol is used to ensure that all processors eventually see the backpatched code.

To put it more specifically, "nop," which is the first word shown in FIG. 1A, is changed to "jmp Label3" as shown in FIG. 1B. Here, "nop" is an instruction that means no operation and is put as a dummy in a location where an instruction is planned to be added later. In addition, "jmp" is a branch instruction and has a conditional branch, which branches only if a certain condition is true, and also has an unconditional branch, which branches unconditionally. FIG. 1B shows the unconditional branch and indicates that an unconditional branch to "Label3" is made. An instruction sequence in the machine language is sequentially executed. Thus, the instructions are executed in the order of "Label1," "Label2, " "Label3" and then back to "Label2." However, with the aforementioned change, "Label3" is firstly executed while "Label1" and "Label2" are skipped, and then "Label2" is executed. Thus, optimization of the program can be achieved.

Furthermore, there is a technique to dynamically rewrite a binary sequence, which is an instruction sequence, by using a hardware transactional memory (HTM) (refer to United States (US) Patent Application Publication No. 2009/0006750 Description, for example). In multi-core processors, a shared-memory parallel program in which threads executed in parallel share and handle data is often used. Here, as the techniques to prevent an access conflict, there is a technique that uses a lock operation and a technique called HTM, which uses no lock operation.

The HTM is a transactional memory implemented as hardware. With the HTM, instead of locking a shared resource previously, each thread in execution holds its copy locally. Then, after confirming at the end of processing that there is no change between the value of the shared resource and the value of the copy held locally, the tread writes the results of the processing at once. Here, if another thread rewrites and changes the value in the shared resource, the tread discards the completed processing and then performs the processing again. Here, a transaction refers to processing of a series of processing operations executed by a single thread.

With this technique, when a binary sequence is rewritten, the binary sequence is written by a transaction. Thus, unless the processing of a transaction conflicts with the processing of another thread, the binary sequence can be rewritten. In addition, even if there is a conflict, the processing is re-executed from the beginning, so that the binary sequence can be rewritten unless a conflict occurs during the re-execution.

However, the above techniques have their shortcomings. First, with the aforementioned technique to dynamically rewrite a binary sequence by using the CAS instruction, rewriting of only one to two instructions at most is possible. With the CAS technique, a binary sequence including multiple instructions cannot be dynamically rewritten.

Second, with the aforementioned technique using replacement with the branch instruction of the Alpern reference other problems exist. For example as the number of branch instructions increases, so does the code size. Thus, the instruction cache misses increase. Moreover, with this technique as well, only one instruction is rewritten. Thus, a binary sequence including multiple instructions cannot be dynamically rewritten.

Third, with the aforementioned technique using the HTM of the 2009/0006750 reference, a binary sequence can be dynamically rewritten, but a function call cannot be included in a rewrite target binary sequence. For example, consider a case where a thread 2 rewrites a binary sequence while a thread 1 is executing the original binary sequence. In this case, if the function being executed by the thread 1 is a call destination function, rewriting of the binary sequence by the thread 2 does not fail because the original binary sequence is not executed at this point. Thus, when the thread 1 returns to the call source, the binary sequence has been rewritten in this case. Accordingly, it is impossible to obtain the correct execution result.

Fourth, with respect to the optimization technique called "inlining," which expands a function in the call site, other problems exist. With the inlining technique, for the purpose of preventing an increase in the code size, inlining is ended when the code size increases to a certain threshold. In addition, inlining cannot be performed in a case where the entity of a call target function is unknown at the time of compiling in a language such as Java (registered trademark), which dynamically loads a class. For this reason, in order to inline a function call left without being inlined, the original function needs to be recompiled. Accordingly, there arises a problem that use of the inline technique incurs a compile cost in this case.

Fifth, among the optimization techniques using the HTM, there is an optimization technique for optimizing processing involving a speculatively executed branch by removing a limitation due to control dependency from a hot trace. With this technique, a trace is generated by deleting a branch destination having an instruction causing an abort in a conditional branch at the time of compiling. Then, if the trace causes aborts frequently at the time of execution, the trace is discarded, and a new trace is generated by recompiling. Since recompiling is required in this case as well, there arises a problem that use of the technique incurs a compile cost.

SUMMARY OF THE INVENTION

In view of the aforementioned problems, the object of the present invention is to provide an apparatus, a method, and an article of manufacture capable of dynamically rewriting a binary sequence including multiple instructions including a function call, dynamically inlining function call processing without recompiling, and dynamically replacing a trace with a new trace.

In one aspect of the invention a programming optimizing apparatus is provided which includes a transactional memory enabling exclusive control to execute a transaction, the apparatus including: a first code generating unit configured to interpret a program, and generate first code in which a begin instruction to begin a transaction and an end instruction to commit the transaction are inserted before and after an instruction sequence including multiple instructions to execute designated processing in the program; a second code generating unit configured to generate second code at a predetermined timing by using the multiple instructions according to the designated processing; and a code write unit configured to overwrite the instruction sequence of the first code with the second code or to write the second code to a part of the first code in the transaction.

In the processing using a transactional memory, a transaction is speculatively executed, and in a case where the transaction cannot be atomically executed due to a conflict with memory access from another thread, the transaction is aborted. Then, the processing up to this point is discarded, and the transaction is re-executed. The exclusive control of the transaction is achieved in this manner. For this reason, the transaction is formed by inserting the begin instruction and the end instruction of the transaction before and after the instruction sequence for the designated processing. Accordingly, in a case where a conflict with memory access from another thread occurs, the transaction can be surely aborted and then re-executed. Thus, it is possible to obtain the correct execution result.

Here, "speculatively executed" means that processing at a branched destination is executed previously in a case where a program conditionally branches in the middle of the program. In addition, "atomically" means that processing operations by respective instructions in the transaction are seen as a single processing operation from other threads, and the progress in the course of the processing operations is not observed.

The designated processing corresponds to function call processing or processing involving a branch, for example. The function call processing includes setting of an argument, calling of the function, and reading of a return value for calling the function, and includes, as multiple instructions, an instruction to set the argument, an instruction to call the function, and an instruction to read the return value. The processing involving a branch includes at least one branch, and as multiple instructions, at least one branch instruction, and an instruction to be executed at the branch destination.

The second code generating unit generates, in response to the interpretation of the called function, the second code optimized by replacing an instruction to call the function in the instruction sequence with an instruction to read a value in the called function, by changing a parameter in the instruction to read the value, and then by deleting an unnecessary instruction group including the instruction to set an argument and the instruction to read a return value in the instruction sequence.

This optimizing apparatus is capable of dynamically rewriting a binary sequence including multiple instructions including a function call, by placing, in a transaction, an instruction sequence including multiple instructions for executing the designated processing, then, generating optimized code on the basis the placed instruction sequence, and then writing the optimized code on the instruction sequence. In addition, what is compiled at the time of execution is only a call destination function, so that function call processing can be dynamically inlined without recompiling the program.

Moreover, the optimizing apparatus can further include a size judgment unit configured to judge whether the code size of the second code is not greater than the code size of the instruction sequence of the first code. Thus, if the size judgment unit judges that the code size of the second code is not greater than the code size of the instruction sequence, a code write unit can overwrite the instruction sequence of the first code with the second code. If the code size of the second code exceeds a threshold, the instruction sequence is not rewritten.

Aside from the size judgment unit, the program optimizing apparatus can further include a frequency judgment unit configured to judge, when the program is interpreted, whether an execution frequency of the branch destination is lower than a threshold, by using execution frequencies obtained from the counted number of positive results and the counted number of negative results of the branch instruction. In this case, responding to, as the predetermined timing, the judgment, made by the judgment unit, that the execution frequency of the branch destination is lower than the threshold, in the interpreting of the program, the second code generating unit generates a trace for forming the second code, the trace being a sequence of a control flow up to the branch instruction immediately before the branch destination where the execution frequency is judged to be lower than the threshold.

The program optimizing apparatus can include: an abort judgment unit configured to judge whether the number of aborts caused by an instruction in the branch destination exceeds a set value during execution of the program; and a trace search unit configured to search multiple traces generated by the second code generating unit to find the trace not including the instruction having the number of aborts exceeding the set value, from multiple traces generated by the second code generating unit, if the abort judgment unit judges that the number of aborts caused by the instruction in the branch destination exceeds the set value. In this case, the code write unit writes the second code including the trace found by searching to a part of the first code in the transaction.

The configuration is employed, which includes the frequency judgment unit, the abort judgment unit, and the trace search unit in addition to the aforementioned first code generating unit, the second code generating unit, and the code write unit. Based on the execution frequency, the first trace is generated, and then, the first code is generated by placing the first trace in the transaction. Then, at least one second trace is generated from the first trace, and the second code is generated by inserting the end instruction of the transaction in the second trace. When an abort occurs frequently, a second code with which no abort occurs is selected from the generated second codes by searching, and then, the selected second code is written. Thus, the trace can be dynamically replaced with a new trace without recompiling the program. Accordingly, the performance of the application can be improved.

In another aspect of the present invention an optimization method to be executed by the program optimizing apparatus is provided. The method is executed by the program optimizing apparatus including a transactional memory and includes the steps of: interpreting a program and generating first code in which a begin instruction to begin a transaction and an end instruction to commit the transaction are inserted before and after an instruction sequence including multiple instructions to execute designated processing in the program; generating second code at the time of interpreting the program or during execution of the program by using the multiple instructions according to the designated processing; and overwriting the instruction sequence of the first code with the second code or writing the second code to a part of the first code in the transaction.

In a further aspect of the present invention, an article of manufacture tangibly embodying computer readable non-transitory instructions which, when implemented, cause a computer to carry out the steps of a method including interpreting a program and generating first code in which a begin instruction to begin a transaction and an end instruction to commit the transaction are inserted before and after an instruction sequence including a plurality of instructions to execute designated processing in the program; generating second code at a predetermined timing by using the plurality of instructions according to the designated processing; and overwriting the instruction sequence of the first code with the second code or writing the second code to a part of the first code in the transaction. The article of manufacture, by way of example and not limitation, can be a recoding medium such as a CD-ROM, a DVD or an SD card.

BRIEF DESCRIPTION OF THE DRAWINGS

FIG. 4A is a diagram illustrating code for executing a function call, and FIG. 4B is a diagram illustrating code obtained by compiling the code according to an embodiment of the present invention.

FIG. 6A is a diagram illustrating code of a call destination, and FIG. 6B is a diagram illustrating code obtained by compiling the code according to an embodiment of the present invention.

FIGS. 7A and 7B are diagrams illustrating code optimized by replacing an instruction and deleting unnecessary instructions according to an embodiment of the present invention.

DETAILED DESCRIPTION OF THE PREFERRED EMBODIMENTS

Figure 1A:
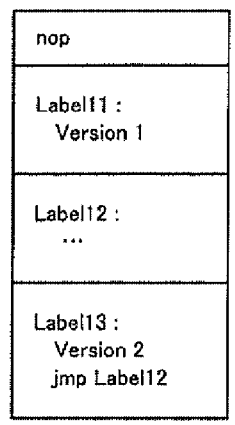
FIGS. 1A and 1B are diagrams illustrating a program before and after a load and store instruction is replaced with a branch instruction to branch to a patch area.
Figure 1B:
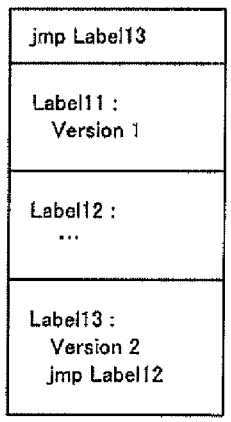
Figure 2:
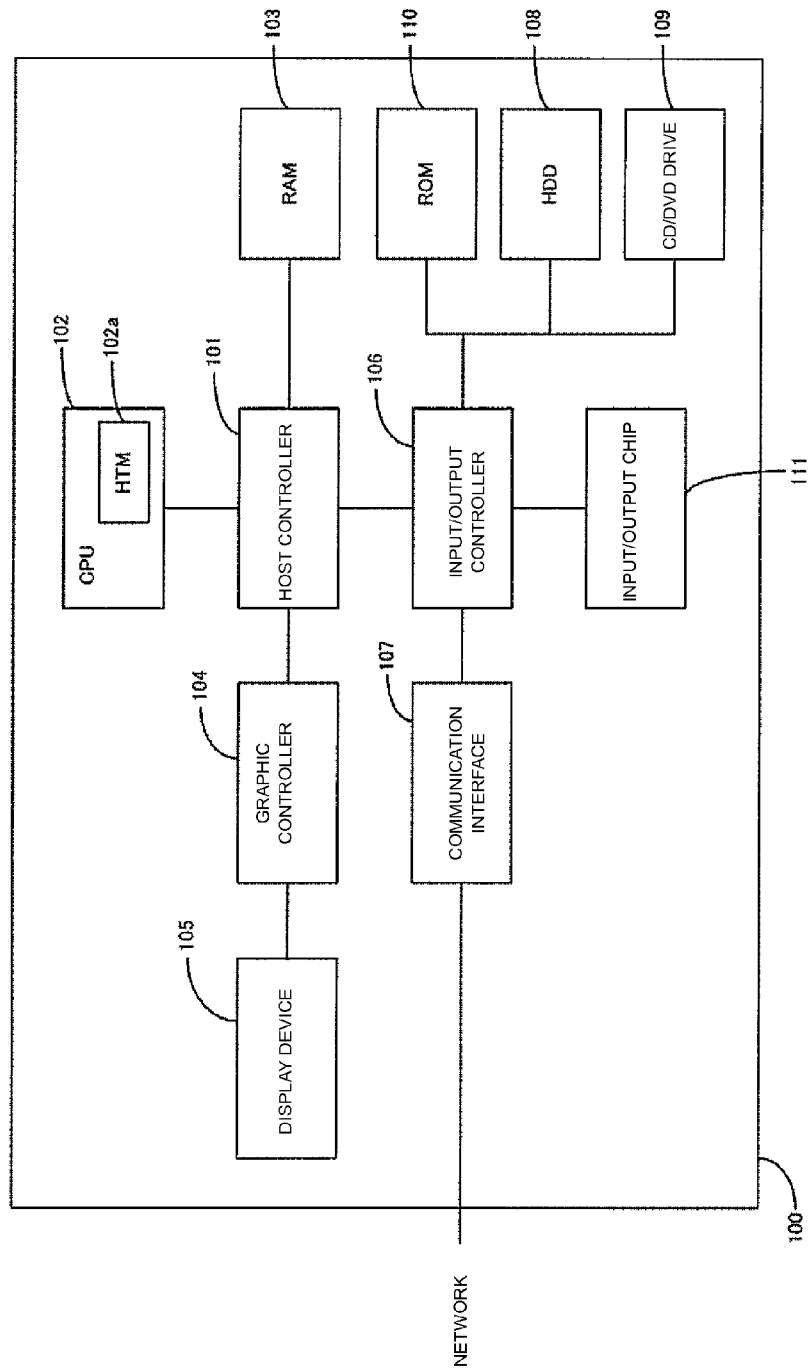
FIG. 2 is a diagram showing an example of a hardware configuration of a program optimizing apparatus of the present invention.

Hereinafter, the present invention will be described with specific embodiments shown by the drawings, but the present invention is not limited to the embodiments described later. FIG. 2 is a diagram illustrating a hardware configuration of a program optimizing apparatus of the present invention. This optimizing apparatus 100 is an apparatus configured to receive a processing target program written in a programming language such as the aforementioned assembly language, C, C++, or Java (registered trademark), then to rewrite an instruction sequence including multiple instructions for executing designated processing in the program, and to optimize the program. Hereinafter, any program simply described as a program means this processing target program.

This optimizing apparatus 100 can be an apparatus capable of storing an optimizing program for implementing the aforementioned processing and for executing the program; and an apparatus such as a PC, a server or a workstation can be used as the optimizing apparatus.

The optimizing apparatus 100 includes as hardware and thus can be configured of, for example, a CPU 102, a RAM 103, a graphic controller 104, and a peripheral device including a display device 105, which are connected to each other via the host controller 101. The optimizing apparatus 100 further includes input output devices including a communication interface 107 connected to the host controller 101 via an input/output controller 106, a hard disk drive (HDD) 108, a CD/DVD drive 109 and the like. The optimizing apparatus 100 further includes a ROM 110 connected to the input/output controller 106, and a legacy input/output device including an input/output chip 111. The apparatus can additionally include an SD card reader or the like for reading an optimizing program, a processing target program, other programs or data which is recorded on an SD card used as a recording medium.

The host controller 101 connects the RAM 103, the CPU 102 and the graphic controller 104 together, the CPU 102 and the graphic controller 104 accessing the RAM 103 at a high transfer rate. The CPU 102 operates on the basis of the aforementioned optimizing program and the like stored in the ROM 110 and the RAM 103 and controls each of the units. The CPU 102 is configured as a multi-processor capable of performing parallel processing and includes an HTM 102i a. The HTM 102a is a transactional memory implemented as hardware with which, instead of locking a shared resource previously, each thread in execution holds its copy locally, as described above. Then, it is confirmed at the end of processing that there is no change in the value of the shared resource and the value of the copy held locally, and the results of processing are written at once. Meanwhile, if another thread performs rewriting, the values are changed, and thus the HTM 102a can discard the processing itself and then can perform the processing again.

The graphic controller 104 acquires image data generated by the CPU 102 and the like on a frame buffer provided in the RAM 103 and displays the image data on the display device 105. The graphic controller 104 can also include, in the graphic controller 104, the frame buffer for storing the image data generated by the CPU 102 and the like.

The input/output controller 106 connects the communication interface 107; the HDD 108 and the CD/DVD drive 109, which are relatively high speed input/output devices, to the host controller 101. The communication interface 107 communicates with another device via a network. The HDD 108 is capable of storing therein the aforementioned optimizing program, other programs and various types of data. In a case where the aforementioned optimizing program, a processing target program, other programs and various types of data are recorded on a CD-ROM or a DVD, the CD/DVD drive 109 can read the programs and the data and then provide them to the input/output chip 111 via the RAM 103.

To the input/output controller 106, the ROM 110 and a relatively low speed input/output device such as the input/output chip 111 are connected. The ROM 110 stores therein a boot program for loading an OS from the HDD 108 and starting the OS, and firmware or the like in which initial setting information of a computer and devices are recorded. The input/output chip 111 connects input/output devices of the units via a parallel port, a serial port, a keyboard port, a mouse port and the like.

The optimizing program is stored in a recording medium such as a CD-ROM, a DVD, an SD card or the like and then provided to the user. This optimizing program is read from this recording medium, then installed on the HDD 108 or the like by the input/output controller 106 and then read and executed by the CPU 102. The present invention is, however, not limited to this configuration, and the optimizing program can be stored in an HDD or the like of a server connected to the network and can be read from the HDD or the like of the server and executed.

The program can be any program or application as long as the program is written in the aforementioned programming language. The program can be compiled and executed after the program is read from the HDD 108 or a recording medium or is received from another PC or the like connected to the network.

Figure 3:
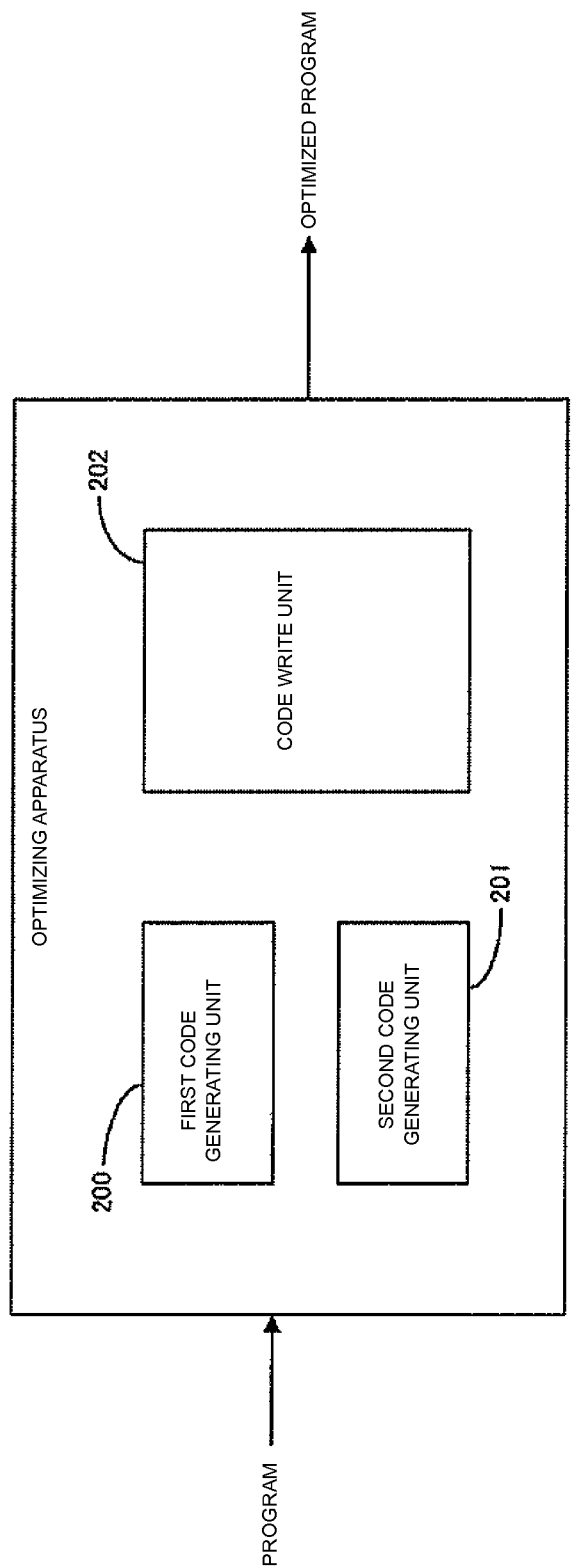
FIG. 3 is a functional block diagram of the program optimizing apparatus according to an embodiment of the present invention according to an embodiment of the present invention.

FIG. 3 is a functional block diagram of the program optimizing apparatus of the present invention. This optimizing apparatus includes the transactional memory. Thus, in a case where there is a conflict between the processing of a transaction and the processing of another transaction, the processing of one of the transactions is entirely discarded and re-executed from the beginning. Thus, exclusive control can be achieved. In order to achieve the processing of the transaction, the apparatus includes a first code generating unit 200 configured to interpret a program, and generate first code in which a begin instruction to begin a transaction and an end instruction to commit the transaction are inserted before and after an instruction sequence including multiple instructions to execute designated processing in the program.

In addition, this optimizing apparatus includes a second code generating unit 201 configured to generate second code at a predetermined timing (i.e., when the program is interpreted, or during execution of the program). The second code is optimized by replacing, deleting, selecting, etc . . . instructions by using multiple instructions in an instruction sequence.

The optimizing apparatus also includes a code write unit 202 configured to overwrite the instruction sequence of the first code with the second code during execution of the program or to write the second code to a part of the first code when the program is interpreted, in the transaction.

The first code generating unit 200 interprets a program by compiling the program and identifies an instruction sequence including multiple instructions to execute previously designated processing such as function call processing or processing involving a branch in the program. To put it more specifically, code shown in FIG. 4A is compiled to acquire an instruction sequence written in the assembler language as shown in FIG. 4B, and then, an instruction sequence including six instructions from setting of an argument therein to reading of a return value is identified, for example.

The six instructions shown in FIG. 4B are: an instruction to set an argument which is a value to be passed when a function is called; an instruction to load a function table holding therein an address of a call destination function; an instruction to load the address of the call destination function and to set the address in a register; an instruction to make a copy in a count register; an instruction to call a function, Foo2.getValue( ) and an instruction to read a return value.

Then, the first code generating unit 200 inserts a begin instruction to begin a transaction (tbegin) before the identified instruction sequence, i.e., before the instruction to set the argument, and also inserts an end instruction to commit the transaction (tend) immediately after the identified instruction sequence, i.e., after the instruction to read a return value. Thus, the portion of the instruction sequence placed between "tbegin" and "tend" forms a single transaction. Accordingly, even if another thread attempts to perform rewriting while a certain thread executes this transaction, the rewriting fails even if the transaction is in execution of any function (function, add, for example). Thus, it is possible to obtain the correct execution result.

During compiling of the program, the function to be called can be expanded in the call source function by performing the aforementioned inlining, this inlining does not mean to inline all the functions in the program during the compiling, and is not capable of inlining all the functions either. This is because, for the purpose of preventing an increase in the code size, the inlining is ended when the code size increases to a certain threshold, so that a function remaining is not inlined. Moreover, in a program written in a language such as Java (registered trademark) which dynamically loads a class, the call target function is not determined until the time of execution. Accordingly, the entity of the call target function is unknown at the compiling stage and cannot be inlined.

In order to inline the function remaining without being inlined, the inlining can be performed by recompiling the call source function. However, in the optimizing apparatus of the present invention, when the entity of the call target function is determined by execution of the program and the inlining is thus made possible, the inlining can be performed by only compiling the call destination function.

The second code generating unit 201 compiles the call destination function, and then, in response to the enabling of the inlining, generates the second code in the following manner by using the multiple instructions in the rewrite target instruction sequence during execution of the program. Specifically, the instruction to call the function is replaced with an instruction to read the value of a variable of the call destination function. Then, the argument of the instruction to read the value of the variable, which is placed by the replacement, is changed, and the instruction that is no longer necessary is deleted.

The code write unit 202 overwrites the rewrite target instruction sequence of the first code with the second code in the transaction in response to the generation of the second code. Thus, the program to be executed is optimized, so that the performance of the program can be improved, and the processing speed can be improved as well because the value of the variable can be directly read without calling the function.

Figure 5:
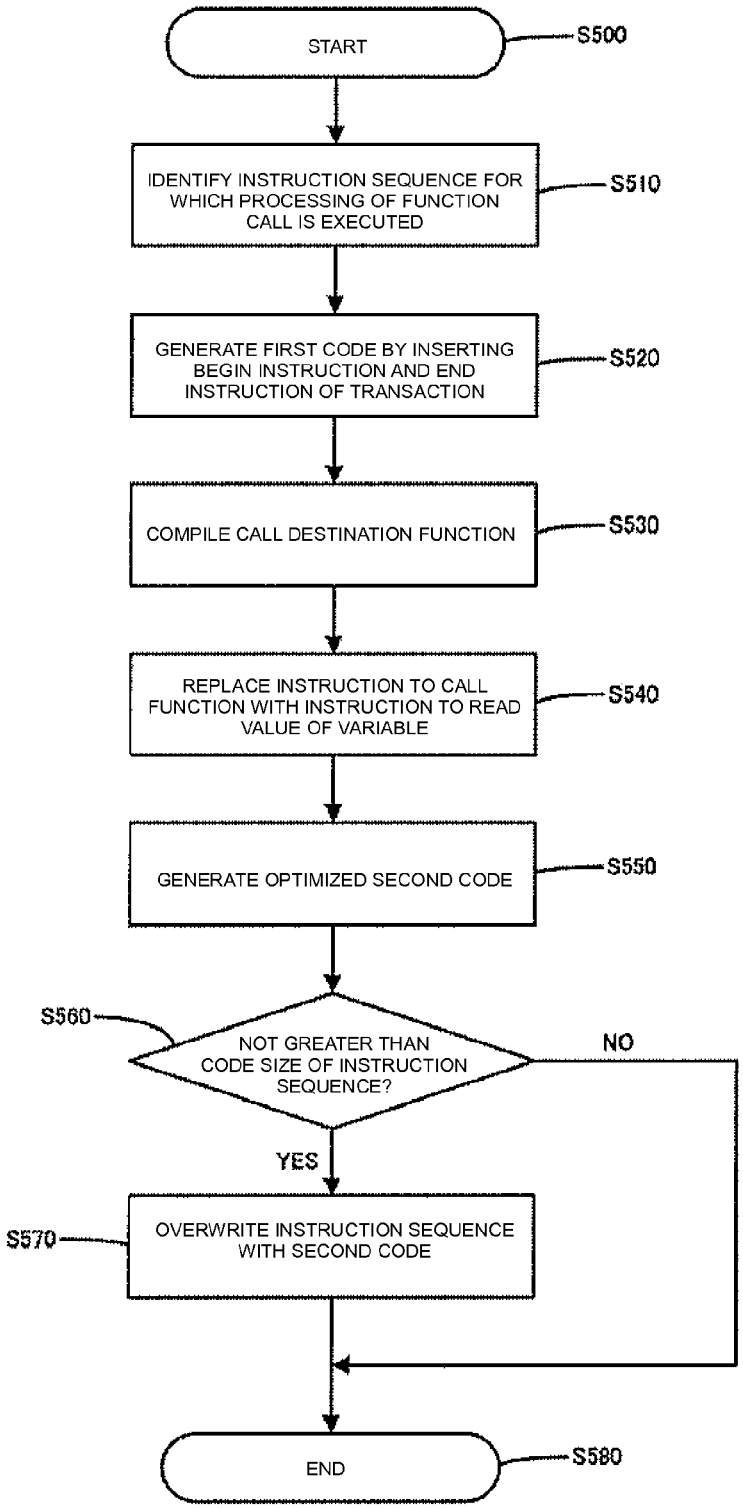
FIG. 5 is a flowchart showing a flow of processing for optimization by overwriting an instruction sequence for executing function call processing according to an embodiment of present invention.

The processing for inlining a function call by using the program optimizing apparatus of the present invention will be described in detail with reference to the flowchart shown in FIG. 5. This processing starts from step 500, and first, in step 510, an instruction sequence for which processing of a function call that fails to be inlined during compiling of functions is executed is identified. To put it more specifically, the program is interpreted to search for an instruction to call a function. Then, among the found instructions, an instruction for which a call destination function is not expanded in a call source function is identified. Then, an instruction to set a value of an argument to be passed to the function, an instruction to read a return value of the function, and the like which relate to the instruction to call the function are identified. Then, the instruction sequence including these multiple instructions is identified as a rewrite target instruction sequence. Next, in step 520, the first code is generated by inserting the begin instruction and the end instruction of the transaction before and after the instruction sequence identified as the rewrite target.

In a case where the program is a program written in a language such as Java (registered trademark) which dynamically loads a class, for example, the call destination of the function is determined at execution of the program. When the inlining is thus made possible because of the determination of the call destination of the function, the call destination function is compiled in step 530. This call destination function is shown in FIG. 6A, and when this function is compiled, the function is converted, as shown in FIG. 6B, into code including two instructions which are an instruction to read a value of the variable "value" and an instruction to return to the call source.

Referring again to FIG. 5, in step 540, next, the instruction to call a function in the first code generated during the compiling in step 510, i.e., "bctrl" shown in FIG. 4B, is replaced with an instruction to read the value of the variable, which is converted by compiling in step 530, i.e., "lwz r3, 16(r3)" as shown in FIG. 6B. Accordingly, the code as shown in FIG. 7A is generated. Thus, it is made possible to directly read the value of the variable without calling the call destination function.

Subsequently, in step 550, the second code is generated in the following manner. Specifically, an argument needed for reading the value of the variable and a return value to be read are substituted for the instruction to read the value of the variable, which is placed by the replacement. Then, the instruction to set an argument, the instruction to load a function table, and the instruction to load an address of the call destination function, and the instruction to read a return value are deleted, which are no longer necessary.

As shown in FIG. 7B, the second code is represented by only the instruction to read the value of the variable "value," and "nop," which means no operation is written in the portions where the other instructions have been written.

Then, in step 560, whether the code size of the second code is not greater than the code size of the instruction sequence to make the function call is judged. The code size can be defined as a memory capacity required for storing the code. Note that a size judgment unit included in the optimizing apparatus can make this judgment.

The instruction sequence to make the function call shown in FIG. 4B includes the six instructions. Meanwhile, the second code shown in FIG. 7B has five instructions corresponding to "nop" but practically includes a single instruction. Thus, a significant reduction in the execution time is considered to be made. For this reason, the code size of the second code is judged to be not greater than the code size of the instruction sequence to make the function call in this embodiment.

If the code size of the second code exceeds the code size of the instruction sequence to make the function call in the judgment in step 560, the processing proceeds to the end in step 580 without performing the inlining because the code size increases.

On the other hand, if the code size of the second code is not greater than the code size of the instruction sequence, the processing proceeds to step 570, and the instruction sequence to make the function call is overwritten with the second code in the transaction. This overwriting is performed by writing "lwz r8, 16(r5)" over "ori r3, r5, 0" included in the instruction sequence, and writing "nop" over the instructions following this instruction. Upon end of the overwriting, the processing proceeds to step 580, and this processing is ended. As described, because of the overwriting with the code, the size of the program does not increase. Thus, a problem such as lack of memory or a decrease in the processing speed because of an increase in the memory size required at the time of executing the program does not occur.

The optimization of the program by performing the inlining without recompiling has been described above in detail with the function call processing cited as an example of the designated processing. The designated processing is not limited to this processing and processing involving a branch can be cited as well. The processing involving a branch can be identified by searching for a branch instruction because the processing is implemented by an instruction sequence including the branch instruction.

Figure 8:
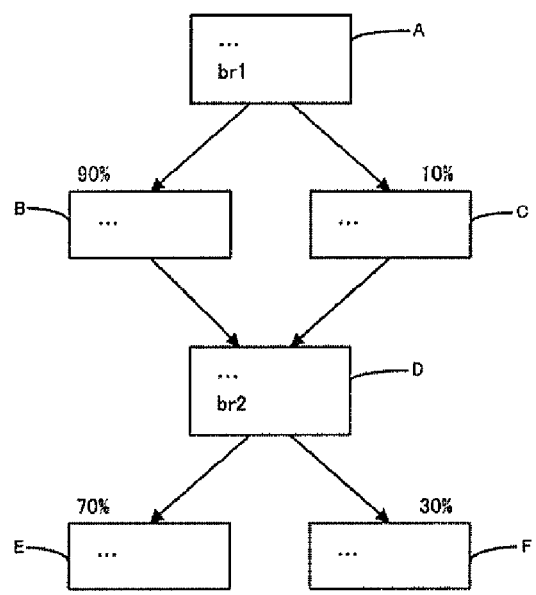
FIG. 8 is a diagram illustrating a control flow graph according to an embodiment of the present invention.

The processing by the program can be represented by the control flow graph as shown in FIG. 8. This control flow graph shows all the paths, in a graphical format, that the program can pass through when the program is executed. Each square shows a basic block and arrows of each of the basic blocks are edges each indicating the control flow between the basic blocks. Each of the basic blocks includes a line of an instruction sequence without transition of the control. In FIG. 8, a conditional branch instruction indicated by "br1" is executed at the end of a basic block A. In the flow, the processing proceeds to any one of the branch destinations, an instruction sequence is executed at the branch destination, the processing proceeds to a basic block D, and a conditional branch instruction indicated by "br2" is executed. Then, the processing proceeds to any one of the branch destinations, and an instruction sequence at the branch destination is executed. Here, a conditional branch has the following steps. Firstly, a conditional judgment is made, and if the condition is satisfied, the processing jumps to one of the branch destinations. On the other hand, if the condition is not satisfied, the processing jumps to the other one of the branch destinations. In contrast, a conditional abort instruction is an instruction to abort a transaction when a certain condition holds true, and then to return the execution of the instruction to the top of the transaction.

During execution of the program, when a conditional branch instruction is executed, the number of positive results and the number of negative results are counted and then can be recorded as history information for the purpose of optimization or the like. The counting is performed in the following manner. In a case of executing the instruction at the branch destination normally, the number of positive results is incremented by one. In cases other than the above, the number of negative results is incremented by one. A counter is used to perform this counting, for example. The number of positive results and the number of negative results are also used for calculating an execution frequency (%). A higher execution frequency shows a larger number of positive results and a smaller number of negative results. The history information is not limited to the aforementioned number of results, and can be the calculated execution frequency. Here, the execution frequency can be set to a value obtained by dividing the number of positive results by the total number of results and then by multiplying the result by 100.

In FIG. 8, the execution frequency of the basic block B on the left side of the drawing shows 90%, while the execution frequency of the basic block C on the right side of the drawing shows 10%, after execution of the conditional branch instruction "br1." Then, the execution frequency of the basic block E on the left side of the drawing shows 70%, while the execution frequency of the basic block F on the right side of the drawing shows 30%, after execution of the next conditional branch instruction "br2."

Figure 9A:
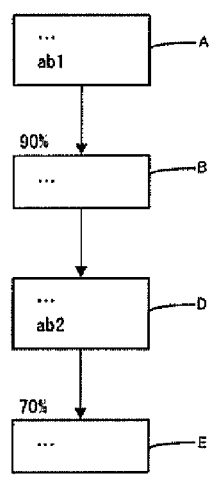
FIGS. 9A and 9B are diagrams illustrating a first trace and a second trace, respectively according to an embodiment of the present invention.

Based on the information, the first code generating unit 200 generates the first trace while selecting basic blocks with a high execution frequency during compiling of the program. In a case where the first trace is generated with reference to the control flow graph shown in FIG. 8, as shown in FIG. 9A, the trace including the basic blocks A, B, D and E is generated by selecting the basic blocks having a high execution frequency. At this time, the conditional branch instructions "br1" and "br2" in the basic blocks A and D, respectively, have a possibility of branching to a basic block not included in the trace. Thus, the conditional branch instructions are changed to conditional abort instructions "ab1" and "ab2," respectively.

During compiling of the program, in response to the generation of the first trace by the first code generating unit 200, a frequency judgment unit included in the optimizing apparatus traces the instruction sequence in the first trace from the last instruction and then judges whether an edge having an execution frequency not greater than a threshold is detected. Then, as a predetermined timing, in response to the generation of the first trace during compiling of the program, and that an edge not greater than the threshold is further detected, the second code generating unit 201 generates a trace up to the branch instruction immediately before the detected edge, as a second trace.

Figure 9B:
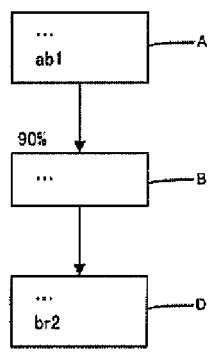

In a case where the threshold is set to 70% based on an empirical value, for example, since the execution frequency of the edge from the basic block D to the basic block E is 70% in the example shown in FIG. 8, the execution frequency is judged to be not greater than the threshold. Thus, a trace including the basic blocks A, B and D up to the branch instruction "br2" immediately before the edge as shown in FIG. 9B is generated as the second trace. Since only this trace is herein generated, there is only one second trace, but it is also possible to generate two or more traces in consideration of frequent occurrences of abort or the like.

Figure 10A:
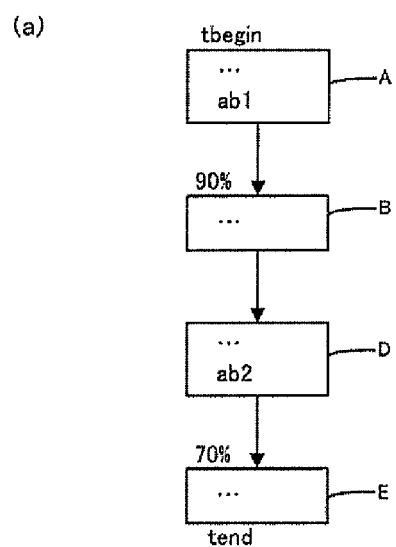
FIGS. 10A and 10B are diagrams illustrating code optimized by writing second code on first code according to an embodiment of the present invention.
Figure 10B:
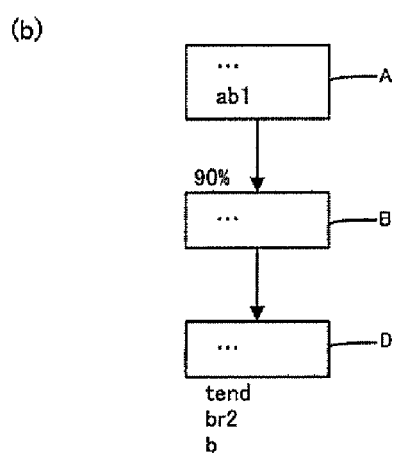

The first code generating unit 200 generates the first code by inserting a begin instruction and an end instruction of the transaction before and after the generated first trace as shown in FIG. 10A. The second code generating unit 201 generates the second code by inserting an end instruction (tend) of the transaction immediately before the last branch instruction "br2" of the second trace, and also inserting an unconditional branch instruction "b" after the branch instruction "br2." Then, if an abort occurs frequently in execution of the first code when the program is actually executed, an instruction with which the abort occurs is identified, and a second trace not including the instruction is searched for. A trace search unit included in the optimizing apparatus can perform this search. If a second trace not including the instruction exists, the code write unit 202 writes second code including the second trace on the first trace in the transaction. Note that, when the second code shown in FIG. 10B is written and then executed, the processing unconditionally jumps to the basic block E after execution of the second trace is ended, and then, the basic block E is executed. The trace shown in FIG. 10B is herein exemplified, but if an abort occurs frequently with "ab2," this means that the result of conditional judgment on the conditional branch instruction "br2" is changed to the basic block F. Thus, in order to perform the processing efficiently, a trace including the basic blocks A, B, D and F can be generated, and this trace can be employed.

Figure 11:
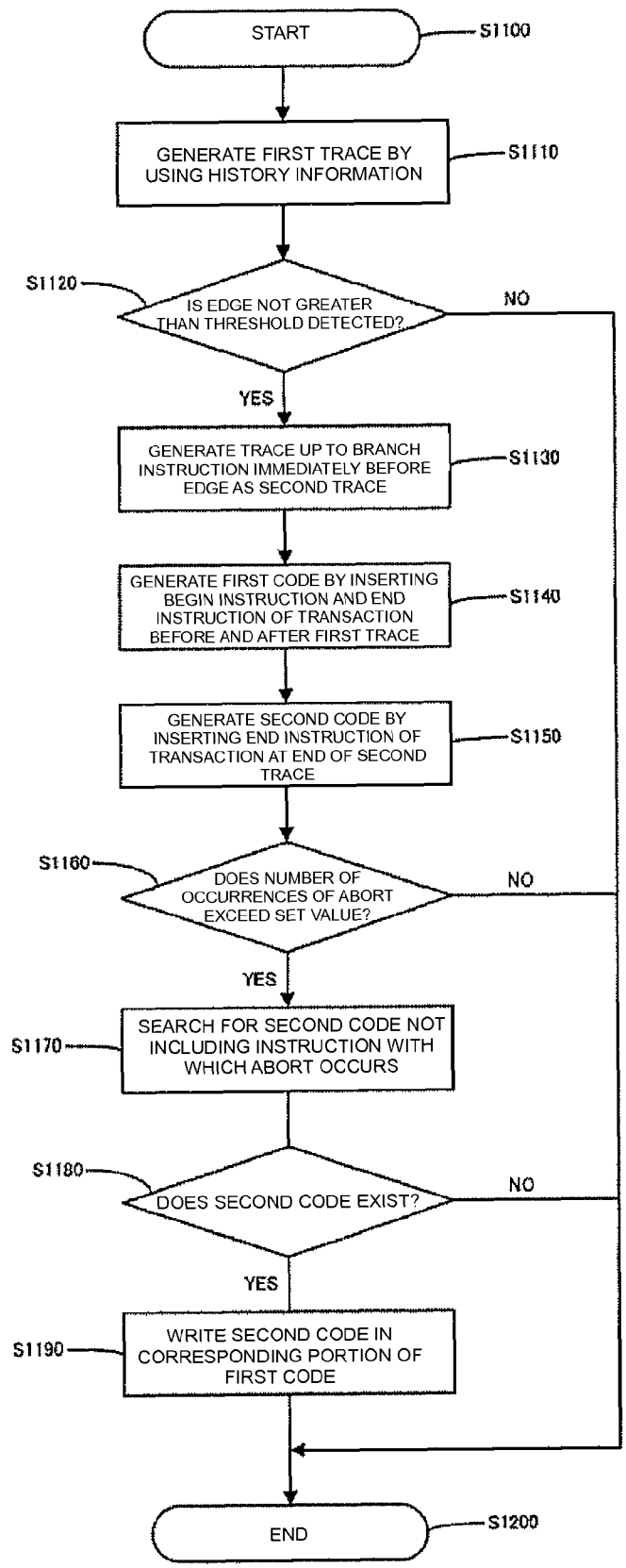
FIG. 11 is a flowchart illustrating a flow of optimization processing by writing a second trace in a first trace according to an embodiment of the present invention.

The processing for performing optimization by rewriting an instruction sequence including multiple instructions to execute processing involving a branch will be described with reference to FIG. 11. The processing starts from step 1100, and then, in step 1110, when the program is compiled, a control flow graph is built, and the first trace, which is a sequence of a control flow with a high execution frequency in the program, is generated while an edge having a high execution frequency is selected by using the history information including the number of results, or the execution frequencies. The first trace includes: an instruction sequence including a branch instruction; and an instruction or an instruction sequence which has at least two branch destinations.

In step 1120, the frequency judgment unit traces the first trace generated in step 1110, from the last instruction or the instruction sequence and judges whether an edge having an execution frequency not greater than a threshold value is detected. If an edge not greater than a threshold value is detected, the processing proceeds to step 1130. Then, the second code generating unit 201 generates a trace up to the branch instruction immediately before the detected edge, as a second trace. On the other hand, if no applicable edge is detected, no trace is generated. Thus, the processing proceeds to step 1200 and the processing is ended.

Here, a trace including the basic blocks A, B, D and F can be generated as a second trace although the execution frequency is 30%, which is low. Then, if an abort occurs with the abort instruction "ab2" in the first trace with a substantially high probability, the first trace can be replaced with this second trace. For this reason, it is possible to generate multiple second traces, and the trace search unit is configured to search for a trace not including an instruction with which an abort does not occur frequently, from the multiple second traces. Then, this trace can be written.

In step 1140, the first code generating unit 200 generates first code at the time of executing the program by inserting a begin instruction to begin a transaction and an end instruction to commit the transaction before and after the first trace generated in step 1110.

Next, in step 1150, the second code generating unit 201 generates second code by inserting an end instruction of the transaction immediately before the last branch instruction in the second trace generated in step 1130. Accordingly, the second trace can be executed in the transaction, and even if another thread attempts to write a trace, the thread fails in the attempt. Thus, the transaction can be surely executed.

In a case where an abort occurs frequently with a certain instruction during execution of the program, in step 1160 an abort judgment unit included in the optimizing apparatus judges whether the number of aborts exceeds a set value. Here, instead of the number of the aborts, an abort rate (%) can be used. If the number of the aborts does not exceed the set value, the processing proceeds to step 1200 without writing the second code, and then the processing is ended.

On the other hand, if the number of the abort exceeds the set value, the processing proceeds to step 1170, and second code not including an instruction with which an abort occurs frequently is searched for from the multiple second codes generated in step 1150. Then, in step 1180, whether such second code exists or not is judged. If the second code exists, the processing proceeds to step 1190, and then, the second code is written to a corresponding portion in the first trace in the transaction. Then, the processing is ended in step 1200.

On the other hand, if no such second code exists, the processing proceeds to step 1200, and then, the processing is ended without writing anything in the first trace. This is because there is no trace to be written.

The optimizing apparatus and the optimizing method of the present invention have been described above in detail with reference to the drawings. However, it is possible to employ another embodiment or to make a change such as addition, change, deletion or the like to the extent that those skilled in the art can conceive easily. In any aspect, as long as the operations and effects of the present invention are exerted, such an embodiment or a change is included in the scope of the present invention.

In addition, the optimizing method can be implemented by a computer-readable optimizing program. In the present invention, this optimizing program can be provided as well. Here, the optimizing program can be stored in a recording medium such as a CD-ROM, a DVD-ROM, an SD card, an HDD or the like and thus be provided therein.

In recent years, multi-core processors in each of which multiple processor cores are integrated on a single chip have been wide spread, and it has been made thus possible to execute multiple threads in parallel, whereby the importance of parallel programming has been increasing. In this parallel programming, a synchronization mechanism using a lock operation is widely used. However, if the lock operation is used, a reduction in the parallelism occurs due to a deadlock or an unnecessary lock. Thus, a synchronization mechanism using a transactional memory using no lock operation has been proposed. For this reason, the transactional memory can be installed on various processors. Therefore, provision of the optimizing apparatus of the present invention, which includes the transactional memory, is advantageous in that a program including a function call in particular can be dynamically optimized to improve the application performance and achieve high speed processing.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

I claim:

1. A program optimizing apparatus including a non-transitory transactional memory enabling exclusive control to execute a transaction, comprising:
   a first code generating unit configured to interpret a program, and to generate a first code in which a begin instruction to begin the transaction and an end instruction to commit the transaction are inserted before and after an instruction sequence including a plurality of instructions to execute a designated processing in the program;
   a second code generating unit configured to generate a second code at a predetermined timing by using the plurality of instructions according to the designated processing; and
   a code write unit configured to overwrite the instruction sequence of the first code with the second code or to write the second code to a part of the first code in the transaction,
   wherein the designated processing is a function call processing, and the plurality of instructions include a set instruction to set an argument, a call instruction to call a function, and a return instruction to read a return value,
   wherein the predetermined timing is a timing of an interpretation of a called function during execution of the program,
   wherein in response to the interpretation of the called function, the second code generating unit generates the second code by replacing the call instruction in the instruction sequence with an instruction to read a value in the called function, by changing a parameter in the instruction to read the value, which is placed by the replacement, and then by deleting an unnecessary instruction group including the set instruction and the return instruction in the instruction sequence.

2. The program optimizing apparatus according to claim 1, further comprising a size judgment unit configured to judge whether a code size of the second code is not greater than a code size of the instruction sequence of the first code, wherein if the size judgment unit judges that the code size of the second code is not greater than the code size of the instruction sequence of the first code, the code write unit overwrites the instruction sequence of the first code with the second code.

3. A program optimization method executed by a program optimizing apparatus including a non-transitory transactional memory enabling exclusive control to execute a transaction, the method comprising the steps of:
   interpreting a program and generating first code in which a begin instruction to begin the transaction and an end instruction to commit the transaction are inserted before and after an instruction sequence including a plurality of instructions to execute designated processing in the program;
   generating second code at a predetermined timing by using the plurality of instructions according to the designated processing; and
   overwriting the instruction sequence of the first code with the second code or writing the second code to a part of the first code in the transaction,
   wherein the designated processing is function call processing, and the plurality of instructions include a set instruction to set an argument, a call instruction to call a function, and a return instruction to read a return value,
   wherein the predetermined timing is a timing of interpreting a function called during execution of the program,
   wherein in the step of generating the second code, the second code is generated in response to interpreting the function called, the second code being optimized by replacing the call instruction in the instruction sequence with an instruction to read a value in the called function, by changing a parameter in the instruction to read the value, which is placed by the replacement, and then by deleting an unnecessary instruction group including the set instruction and the return instruction in the instruction sequence.

4. The program optimization method according to claim 3, further comprising:
   judging whether a code size of the second code is not greater than a code size of the instruction sequence of the first code, wherein
   in the step of writing the second code, if the code size of the second code is judged to be not greater than the code size of the instruction sequence of the first code, the instruction sequence of the first code is overwritten with the second code.

5. A computer readable non-transitory article of manufacture tangibly embodying computer readable instructions which, when implemented, cause a computer to carry out the steps of a method of claim 3.

6. The article of manufacture according to claim 5, tangibly embodying instructions which, when implemented, cause a computer to carry out the steps of:
   judging whether a code size of the second code is not greater than a code size of the instruction sequence of the first code, wherein
   if the code size of the second code is judged to be not greater than the code size of the instruction sequence of the first code, overwriting the instruction sequence of the first code with the second code.

7. A program optimizing apparatus including a non-transitory transactional memory enabling exclusive control to execute a transaction, comprising:
   a first code generating unit configured to interpret a program, and to generate a first code in which a begin instruction to begin the transaction and an end instruction to commit the transaction are inserted before and after an instruction sequence including a plurality of instructions to execute a designated processing in the program;
   a second code generating unit configured to generate a second code at a predetermined timing by using the plurality of instructions according to the designated processing; and
   a code write unit configured to overwrite the instruction sequence of the first code with the second code or to write the second code to a part of the first code in the transaction,
   wherein the designated processing is processing involving a branch, and the plurality of instructions include at least one branch instruction and a branch destination instruction to be executed at a branch destination,
   a frequency judgment unit configured to judge, when the program is interpreted, whether an execution frequency of the branch destination is lower than a threshold, by using execution frequencies obtained from a counted number of positive results and a counted number of negative results of the branch instruction, responding to, as the predetermined timing, a judgment made by the judgment unit that the execution frequency of the branch destination is lower than the threshold, wherein responding includes the second code generating unit generating a trace for forming the second code wherein the trace is a sequence of a control flow up to the branch instruction immediately before the branch destination where the execution frequency is judged to be lower than the threshold.

8. The program optimizing apparatus according to claim 7, further comprising:
   an abort judgment unit configured to judge whether a number of aborts caused by a branch destination instruction exceeds a set value during execution of the program; and
   a trace search unit configured to search a plurality of traces generated by the second code generating unit to find a null trace wherein the null trace does not include the branch destination instruction having the number of aborts exceeding the set value,
   wherein, if the abort judgment unit judges that the number of aborts caused by the branch destination instruction exceeds the set value, the code write unit writes the second code, including the null trace, to a part of the first code in the transaction.

9. A program optimization method executed by a program optimizing apparatus including a non-transitory memory enabling exclusive control to execute a transaction, the method comprising the steps of:
   interpreting a program and generating first code in which a begin instruction to begin the transaction and an end instruction to commit the transaction are inserted before and after an instruction sequence including a plurality of instructions to execute designated processing in the program;
   generating second code at a predetermined timing by using the plurality of instructions according to the designated processing, wherein the designated processing is processing involving a branch, and the plurality of instructions include at least one branch instruction and a branch destination instruction to be executed at a branch destination;
   overwriting the instruction sequence of the first code with the second code or writing the second code to a part of the first code in the transaction;

judging, when the program is interpreted, whether an execution frequency of the branch destination is lower than a threshold, by using execution frequencies obtained from a counted number of positive results and a counted number of negative results of the branch instruction; and responding to a judgment made by the judgment unit that the execution frequency of the branch destination is lower than the threshold, by generating a trace for forming the second code wherein the trace is a sequence of a control flow up to the branch instruction immediately before the branch destination where the execution frequency is judged to be lower than the threshold.

10. The program optimization method according to claim 9, further comprising the steps of:

judging whether a number of aborts caused by a branch destination instruction is larger than a set value during execution of the program; and if the number of the aborts caused by the branch destination instruction is judged to be larger than the set value, searching a plurality of traces generated by the second code generating unit to find a null trace wherein the null trace does not include the branch destination instruction having the number of aborts larger than the set value, wherein in the step of writing the second code, the second code including the null trace is written to a part of the first code in the transaction.

11. A computer readable non-transitory article of manufacture tangibly embodying computer readable instructions which, when implemented, cause a computer to carry out the steps of a method of claim 9.

12. The article of manufacture according to claim 11, tangibly embodying instructions which, when implemented, cause a computer to carry out the steps of:

judging whether a number of aborts caused by a branch destination instruction is larger than a set value during execution of the program; and if the number of the aborts caused by the branch destination instruction is judged to be larger than the set value, searching a plurality of traces generated by the second code generating unit to find a null trace wherein the null trace does not include the branch destination instruction having the number of aborts larger than the set value, and writing the second code including the null trace to a part of the first code in the transaction.

\* \* \* \* \*